March 25, 1952  O. SANDBERG  2,590,128
METHOD OF WRAPPING GENERALLY CYLINDRICALLY
SHAPED ARTICLES
Filed Nov. 29, 1946  6 Sheets-Sheet 1

INVENTOR.
Oscar Sandberg.
BY Bair & Freeman
Attys.

March 25, 1952      O. SANDBERG      2,590,128
METHOD OF WRAPPING GENERALLY CYLINDRICALLY
SHAPED ARTICLES
Filed Nov. 29, 1946      6 Sheets-Sheet 3

INVENTOR.
Oscar Sandberg.
BY Bair & Freeman
Att'ys.

INVENTOR.
Oscar Sandberg.

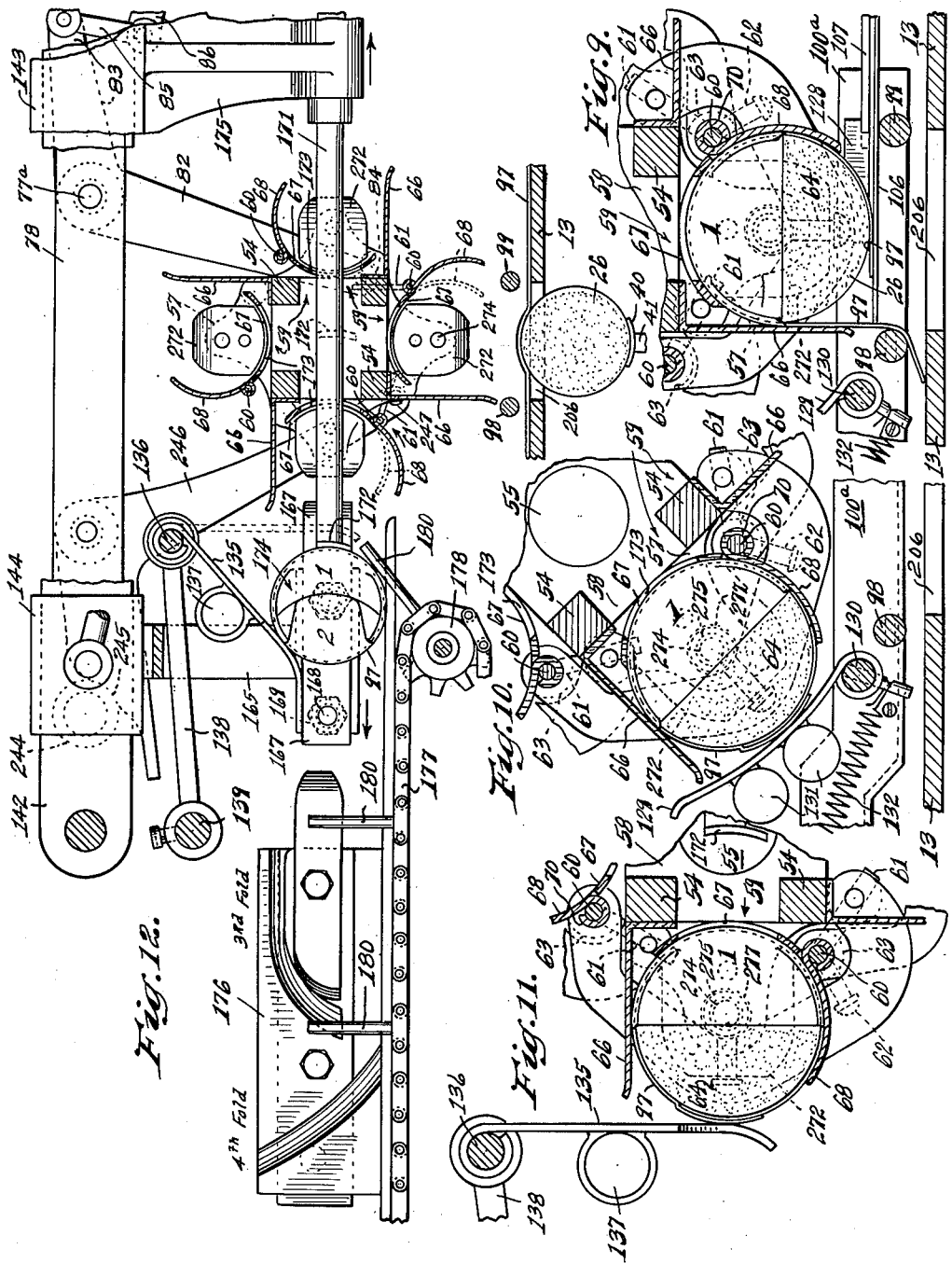

March 25, 1952     O. SANDBERG     2,590,128
METHOD OF WRAPPING GENERALLY CYLINDRICALLY
SHAPED ARTICLES
Filed Nov. 29, 1946     6 Sheets-Sheet 6
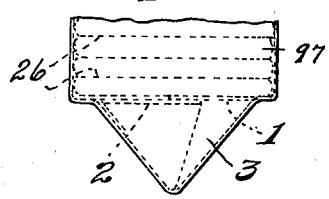
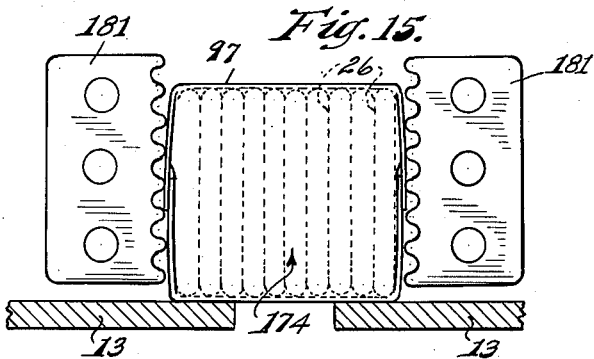
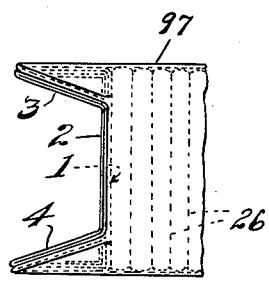
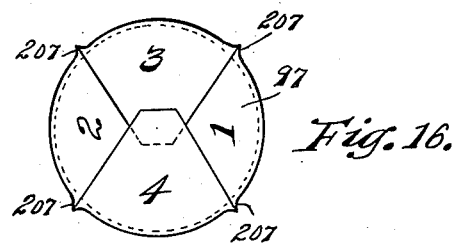
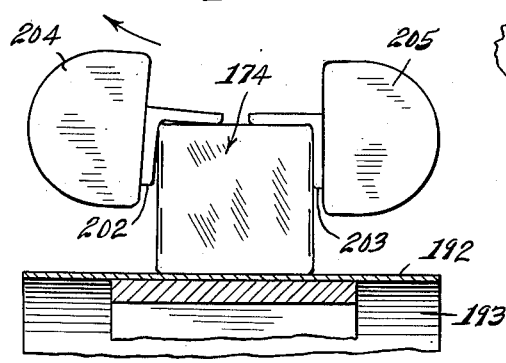
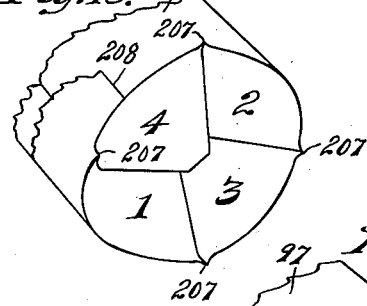
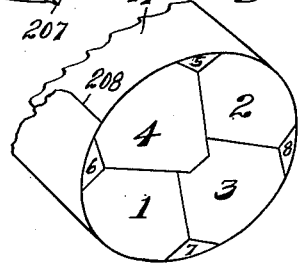
INVENTOR.
Oscar Sandberg.
BY Bair & Freeman
Attys.

Patented Mar. 25, 1952

2,590,128

UNITED STATES PATENT OFFICE 2,590,128

METHOD OF WRAPPING GENERALLY CYLINDRICALLY SHAPED ARTICLES

Oscar Sandberg, Toledo, Ohio, assignor to Lynch Corporation, Anderson, Ind., a corporation of Indiana Application November 29, 1946, Serial No. 712,971

1 Claim. (Cl. 53—14)

This invention relates to a method of wrapping articles and particularly the method of wrapping generally cylindrically shaped articles such as cookies, peanut butter sandwiches, candy rolls, and the like. A machine adapted to practice the improved method was disclosed in my co-pending application Serial No. 686,842, filed July 29, 1946, for package and sealing mechanism and in my co-pending application Serial No. 654,079, filed March 13, 1946, now Patent Number 2,567,405, dated September 11, 1951, for wrapping machine for sandwiches and the like.

It is an object of the invention to provide an effective method for wrapping articles to provide a plurality of flaps at the ends of the package, and then colsely fold the projecting corner of the flaps thereagainst.

It is another object of the invention to provide a method for tigtly and neatly sealing cylindrically shaped articles and to effectively seal such articles.

It is another object of the invention to provide a method of wrapping articles of the types described wherein the articles are rolled after the wrapper is initially disposed about the article and end flaps provided to thereby provide a neat and tightly sealed package.

With these and other objects in view, my invention consists in the arrangement and combination of the various parts of my device whereby the objects contemplated are attained as hereinafter more fully set forth, pointed out in my claim, and illustrated in the accompany drawings, in which:

Figures 1, 2 and 3 constitute a complete elevational view of the machine;

Figure 5 is a vertical sectional view of a portion of the mechanism for raising the articles to be wrapped, and draping the wrapping material therearound;

Figure 6 is a partial vertical sectional view of the articles and the associated mechanism and illustrates the next step in the wrapping process after the steps shown in Figure 5 have been completed;

Figure 7 is a partial vertical sectional view of the mechanism illustrating the next step in the wrapping process after that shown in Figure 6;

Figure 8 is a top view of the articles to be wrapped, illutsrating the first end fold;

Figure 9 is a partial vertical sectional view of the apparatus showing the step after that shown in Figure 7;

Figure 10 is a partial vertical sectional view showing the step after that shown in Figure 9;

Figure 11 is a partial vertical sectional view showing the step after that shown in Figure 10;

Figure 12 is a partial vertical sectional view showing the step after that shown in Figure 11, and illustrating the second fold for the article, together with the ram for removing the article from the retaining wheel and the mechanism for opening the gates in the retaining wheel. Figure 12 also illustrates the mechanism for making the third and fourth folds of the wrapping material;

Figure 13 is a side view of the article, showing the first and second folds completed;

Figure 14 is a top view of the article showing the first and second folds completed;

Figure 15 is a vertical sectional view showing the article with the four flaps of the wrapping material folded sliding through the first set of heating elements;

Figure 16 is an end view of the article with the four flaps of the wrapping material formed thereon in the condition they assume after passing through the first set of heaters;

Figure 17 is a vertical sectional view of a conveyor belt for rolling the package shown in Figure 16 along a second set of heaters;

Figure 18 is a partial perspective view of the article showing the position of the wrapping material prior to the time it enters the rolling portion of the machine, and Figure 19 is a partial perspective view of the article showing the wrapping material in its final position.

Figure 1:
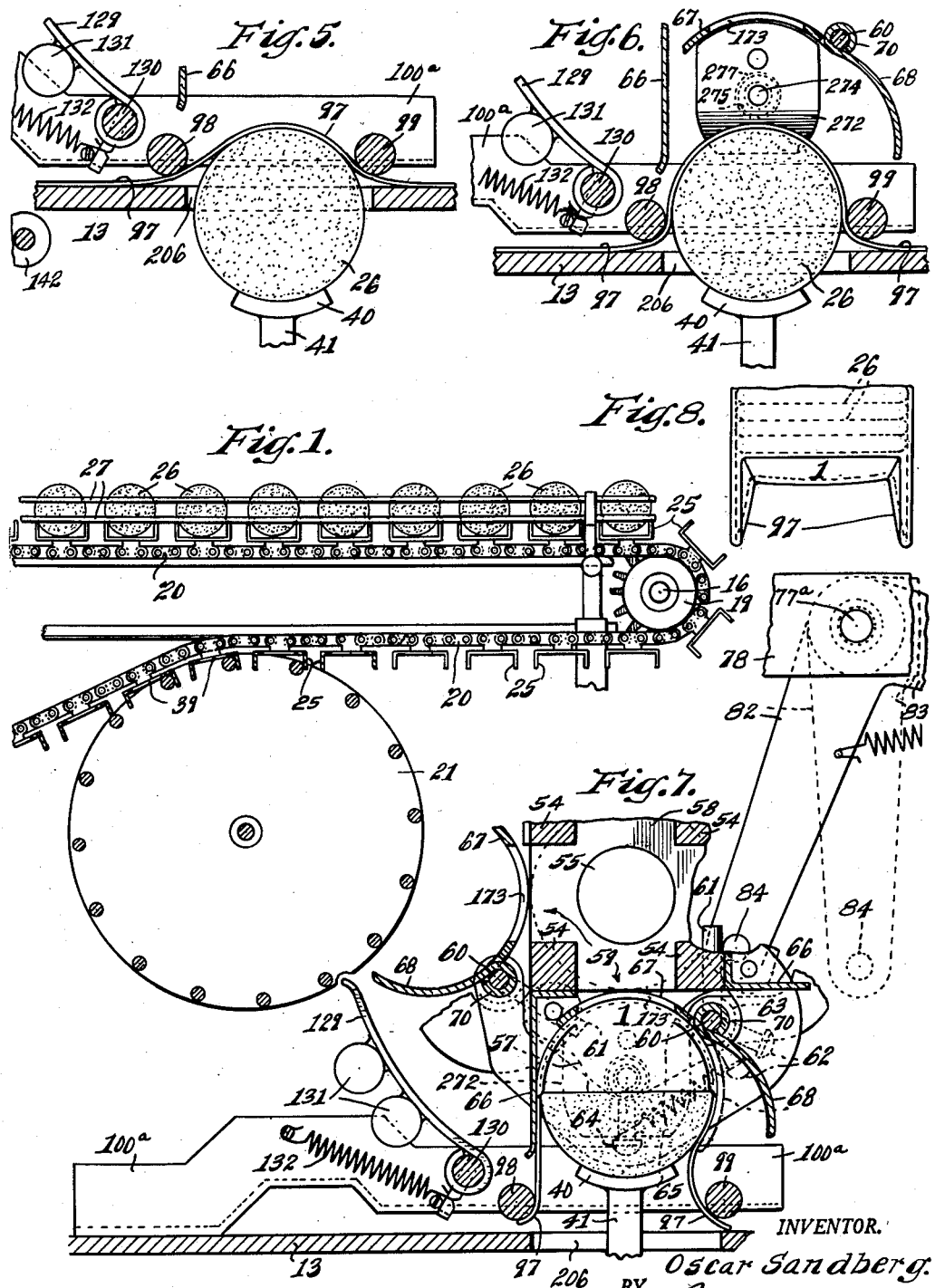
Figure 1 is a diagrammatic side elevational view of a portion of a machine for wrapping cylindrical articles utilized in practicing my method.

Referring specifically to the drawings for a detailed description of the invention, it will first be noted that wherever possible, supporting members, tables, and the like have not been shown, since they form no part of the method claimed. Pocket conveyor shafts 14, 15 and 16 carry sprockets 17, 18 and 19, respectively. Pocket conveyor chain 20 surrounds the sprockets and passes over a large idler wheel 21 shown in Figure 1. The conveyor chain has spaced channel shaped, article-receiving pockets 25 mounted thereon. The pockets 25 are adapted to receive sandwiches or cookies 26 (several, face to face, in each pocket) and to maintain the sandwiches 26 in the pockets, a pair of rods 27 is provided along each side of the conveyor.

The pocket conveyor 20—25 is driven by rotating the shaft 14 through a chain drive 28 from an intermittently operated shaft 29. Shaft 29 is driven through a Geneva movement including a notched disc 30 and a crank pin 32 to coact with the notches 30. Crank pin 32 extends from a crank arm 33 which is secured to a shift 34. The shaft 34 is driven by a chain drive 35 from a main shaft 36 adjacent the lower part of Figure 2, through beveled gears 37 and 38. The main shaft 36 is driven in any suitable manner from an electric motor not shown.

Figure 4:
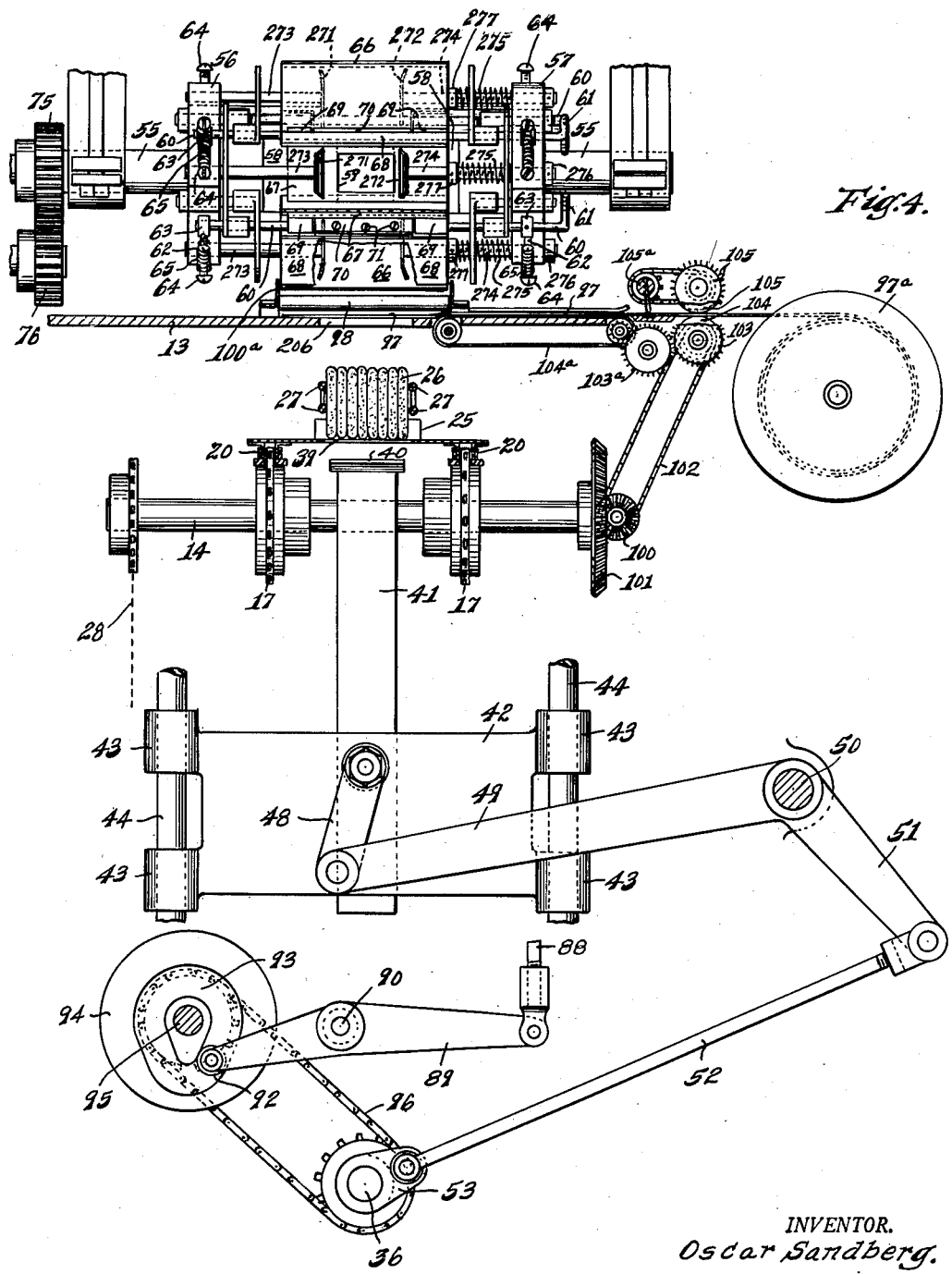
Figure 4 is a vertical sectional view of the machine taken on line 4—4 of Figure 2, and illustrates the articles to be wrapped in their position on the conveyer, and also illustrates the main drive mechanism and the paper feeding mechanism, the latter being shown diagrammatically.

Each pocket 25 of the pocket conveyor is provided with a central opening 39 as shown in Figure 4, and is adapted to permit a ram head 40 to pass up through the pocket. The ram head 40 is on the upper end of a vertical post 41, secured to a slide 42 provided with four bearings 43 as best shown in Figure 4. The bearings 43 slide on vertical guide rods 44. For vertically sliding the slide 42 to operate the arm 40, I provide a link 48 pivoted to the slide and to an arm 49. The arm 49 is secured to a rock shaft 50, the rock shaft 50 being also secured to an arm 51 which is connected by a link 52 to a crank arm 53 on the main shaft 36. The main shaft 36 is rotated once in each cycle of the operation of the wrapping machine so that the arm 40 is thereby reciprocated upwardly and returned downwardly once each cycle and the Geneva moving disc is advanced one sixth of a revolution each cycle. The advance of the Geneva disc advances the pockets 25 one station each cycle, and holds them at their stations, one of which is at the opening 39 of the pocket 25, directly above the ram head 40 so that the ram head may pass up through the pocket.

Above the pocket 25, a folder and retainer head is provided. This is best shown in Figures 2, 4, 7 and 10. It consists of a pair of stub shafts 55, on which a casting is mounted. The casting includes two end plates 56 and 57, with a square connecting post 58 therebetween. At the center of the post 58, two cross passages 59 are provided at right angles to each other, which result in the post 58 having four connecting portions 54.

Each end plate 56 and 57 has journalled therein a rod 60 having a right angle end 61. These rods 60 are constrained to rotate in a clockwise direction in Figure 2 by means of set screws 62 and collar 63 on the rods, the outer ends of the set screws being connected to stationary set screws 64 by springs 65.

It will be noted that four of the rods 60 are provided and that the folding head is arranged with four sandwich-receiving pockets, each formed by flat plate 66 and arcuate plates 67 and 68. The plates 67 are stationary and have eyes 69 loosely journalling the rods 60 so that the rods 60 may rotate. Each one of the plates 68 has one eye 70 secured to its respective rod 60 by set screws 71. The springs 65 normally hold the arcuate plates in the position shown in Figures 6 and 7. The flat plates 66 are secured to the post sections 54 so that they are stationary with respect to the rotary folder head.

The folder head includes a compression plate 75 271 and a compression plate 272 for each of the four pockets of the head. The plate 271 is carried by a rod 273, which is stationary with respect to the folder head as it is carried in the end plate 56. The plate 272 is carried by a rod 274, which is slidable in the end plate 57 and is constrained to move in an inward direction by a spring 275, the inward limit of movement being determined by a stop collar 276 on the outer end of rod 274 striking the plate 57. The inner end of the spring 275 bears against a collar 277 on the rod 274.

The rotary folder head is periodically rotated one-fourth of a revolution by means of gears 75 and 76 and a chain drive 77 from the shaft of the gear 76 to the shaft 29, a ratio being six to four as the shaft 29 is rotated one-sixth of a revolution each cycle and the folder head is rotated one-fourth of a revolution each cycle.

Figure 2:
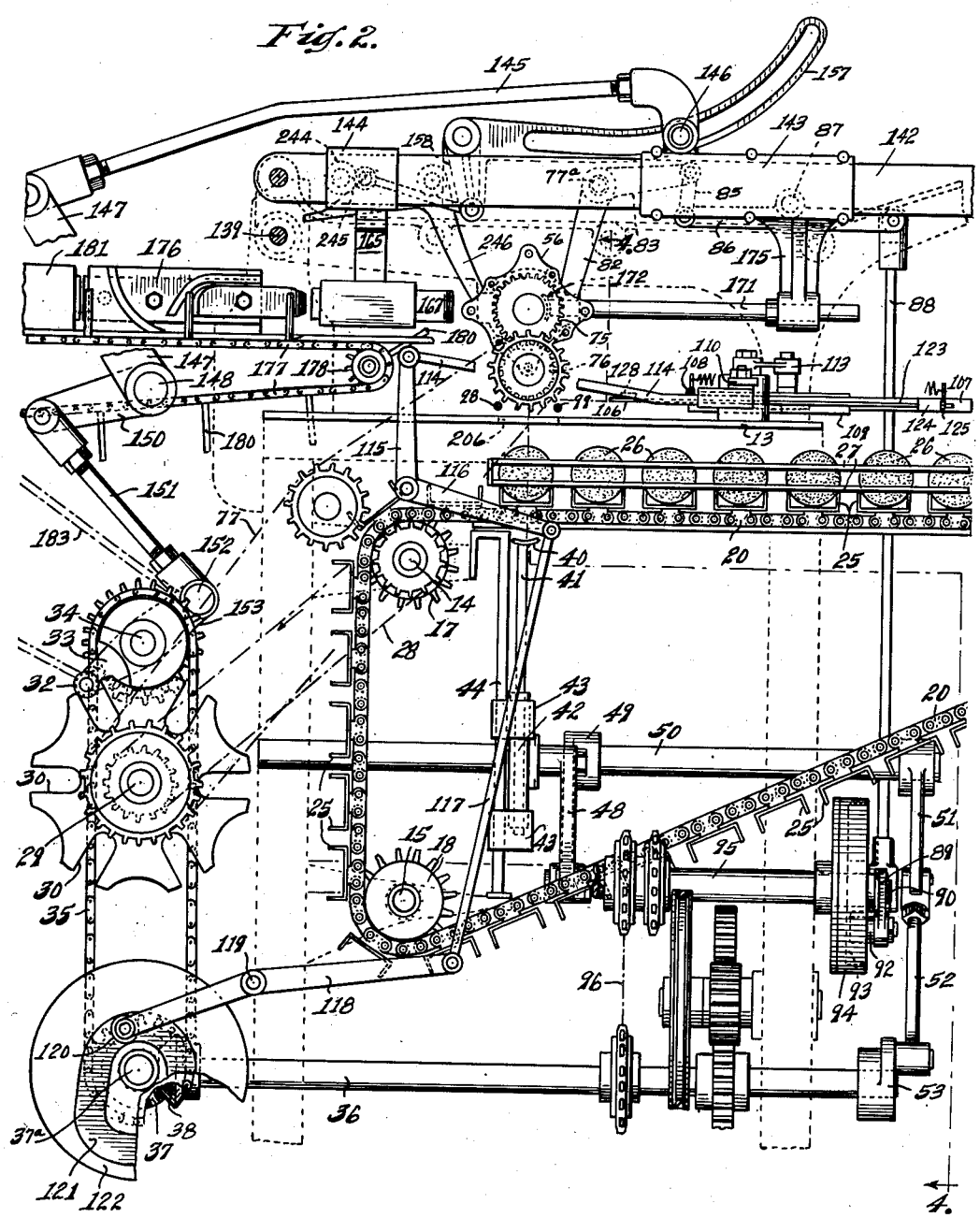
Figure 2 is a side elevational view of the central portion of the machine shown in Figure 1.

With further reference to details of the folder head, means is provided to automatically open the lowermost of the four pockets as the ram head 40 raises. This means consists of a bell crank pivot at 77a on a stationary frame element 78, as shown in Figure 2. The bell crank consists of a depending arm 82 and a substantially horizontal arm 83, the depending arm 82 carrying a laterally projecting stud 84 and the horizontal arm being connected by a link 85 to a lever 86. The lever 86 is pivoted intermediate its ends at 87 to the frame bar 78 and has a vertical link 88 pivotally connected with its rear end.

The link 88 extends downwardly and is pivotally connected to one end of rock arm 89. The rock arm 89 is pivoted at 90 and carries a roller 92 on its other end. The roller 92 is adapted to travel in a cam groove 93 of a cam 94, which cam is mounted on a shaft 95. The parts just described are illustrated in Figures 2 and 4 in relation to the main shaft 36. The shaft 95 is driven from the main shaft 36 by a chain drive 96 and shaft 95 rotates once each cycle of operation of the wrapping machine.

The laterally projecting stud 84 of the bell crank 82, 83 is adapted to engage the laterally extending arm 61 of the lowermost rod 60 of the folder head when the bell crank is rocked clockwise. This rotates the rod 60 counterclockwise as viewed in Figure 7, thereby opening the lowermost pocket in the rotary folder head to permit entry of the sandwiches and their wrapper. After the sandwiches and the wrapper have entered the pocket, the bell crank 82, 83 is rocked counterclockwise for releasing the extension 61 of the rod 60 so that the spring 65 will return the arcuate plate 68 to closed position, as shown by dotted lines, for retaining the partially wrapped package therein, assisted by the plates 66 and 67.

A wrapper for wrapping the package is shown at 97 and is preferably formed of "Pliofilm" or the like, which is adapted to be sealed by the application of heat thereto, although waxpaper, cellophane or the like may be used. The wrapper is preferably supplied to the wrapping machine from a roll 97a, the wrapping machine being provided with means to cut the strip from the roll 97a into individual wrappers 97. I have diagrammatically illustrated a feed mechanism for the wrapping material from the roll 97a in Figure 4 of the drawings. A wrapper supply mechanism may be utilized such as shown in my Patent No. 2,283,096 issued May 12, 1942, if desired. The wrapper 97 is fed onto a table 13 in flat form beneath a pair of wrapper control rods 98 and 99. The feeding mechanism comprises bevel gears 100 and 101, the bevel gear 101 being driven by pocket conveyer shaft 14 and the gear 100 is, therefore, driven in synchronism with the pocket conveyer 20, 25. A sprocket is provided on the gear 100 and drives a chain 102, which in turn drives a sprocket on which a gear 103 and feed roll 104 are mounted. Feed roll 104 drives an upper feed roller 105, which in turn drives a wheel having a cutting knife 105a thereon. Gear 103 drives through a gear chain 103a to rotate a conveyer belt 104a, which conveys wrapping material to the plate 13, as best shown in Figure 4.

A bottom flap folder is provided for folding the bottom flap of the package as shown in Figures 2 and 9, and this folder consists of a paper pusher plate 106 carried by a slide bar 107 and hinged thereto on a pivot 108. This arrangement permits upward floating movement of the paper pusher plate 106 and limits its downward movement due to gravity.

The slide bar 107 is slidably mounted in slideways 109 and is reciprocated therein by means of a lever 110. The lever 110 is pivoted intermediate its ends (not shown) and has one of its ends connected to the slide bar 107 by means of a link 113. The other end of the arm 110 is connected by a link 114 to an upwardly extending arm 115 of a bell crank having a horizontal arm 116. The arm 116 is connected by a link 117 to a rock arm 118 pivoted at 119. The arm 118 carries a roller 120 adapted to travel in a cam groove 121 of a cam 122. The cam 122 is mounted on a shaft 37a whereby the slide bar 107 is reciprocated forwardly and returned rearwardly once during each operating cycle of the wrapping machine.

The bottom folder further includes a pair of rods 123 slidably supported by the vertical flange of the paper pusher plate 106 and by a crossbar 124 secured to the slide bar 107, the crossbar 124 having perforated ends to slidably receive the rods 123. On the rear ends of the rods 123, collars 125 are mounted and these are constrained to engage the crossbar 124 as a stop by means of a spring (not shown) for each rod. The front ends of the rods are connected together by a member having a pair of forwardly projecting package engaging elements 128, the purpose of which will hereinafter appear when describing the operation of the machine. A complete description of the paper pusher is contained in my aforesaid co-pending application, Serial No. 654,079, now Patent No. 2,567,405, granted September 11, 1951.

A heating plate 129 is pivotally mounted on a rod 130 carried by supports 100a as shown, for example, in Figure 7. Heating elements 131, preferably of the electrically energized type, are secured to the heating plate 129. The heating plate is constrained to move toward the rotary folder head by means of a spring 132.

A second heating plate 135 is shown, for example, in Figures 11 and 12, and is freely hinged at 136 and normally remains in a substantially vertical position due to gravity. This heating plate 135 has a heating element 137 thereon. The hinge connection 136 is supported by arm 138, which is pivotally mounted at 139.

A pair of fore-and-aft extending rods 142 slidably support a pair of slides 143 thereon. These slides are similar to the slide 142. The slides 143 are reciprocated once each cycle of operation of the wrapping machine by means of a link 145 pivoted thereto at 146 and extending forward to pivotally connect with the upper end of an arm 147. The arm 147 is secured at its lower end to a rock shaft 148. A horizontal arm 150 is secured to the rock shaft 148 and its other end is connected by a link 151 to a crank pin 152 of a crank arm 153. Crank arm 153 is secured to the shaft 34.

A pair of slides 144 is operated from the slides 143 by a suitable linkage (not shown). The slides 144 carry a roller 244 adapted to engage a cam surface 245 of a bell crank shaped cam arm 246. A stud 247 is carried by the lower end of arm 246 and is adapted to engage the end 61 of rod 60 corresponding to that pocket of the rotary folding head which at that time is in a forward position and ready for its arcuate plate 68 to be opened for a purpose which will hereinafter appear.

From the construction of the parts just described, it will be clear that a relatively long sliding motion of the slides 143 on rods 142 will result in slight swinging movement of the bell crank 157, 158, thereby resulting in a slight sliding movement of the slides 144 on the rods 142. The purpose of this arrangement is to provide a desired movement of the slides 144 for operating a second end flap folder. Depending from the slide bars 144 is a pair of brackets 165 which carry stationary shoes 167, which float by means of a rod 168 slidably extending through the bracket and provided with stop nuts 169.

For removing a partially wrapped package of sandwiches from a pocket of the rotary folder head, when such pocket is rotated from a lower position as shown in Figure 9, to a forward position as shown in Figure 11, I provide a package pusher rod 171 having an arcuate pusher plate 172 on its forward end. The plate 172 is adapted to pass through the central opening 59 of the folder head and then through an opening 173 of the arcuate plate 67, as shown in Figure 12, by way of example. In so doing, it pushes the package indicated in this figure as 174 between shoes 167 so that the shoes provide a second flap folding operation on the package, as shown in Figures 12, 16, 18 and 19. At the same time, the shoes 167 are being moved toward the right in Figure 12 while the package is being moved toward the left to effect the second end flap fold in a short period of time, which is required for this part of the mechanism to remain in synchronism with the rest of the machine.

The package pusher rod 171 is carried by brackets 175 depending from the slides 143. The package pusher plate 172 is thereby operated once on each cycle of the machine.

Ahead of the second end flap folder shoes 167 is a folding way 176. This way is of the usual construction, such as shown in my patents and applications above mentioned, and is adapted for successively folding the third and fourth end flaps of the package as shown at "3" and "4" in Figures 16, 18 and 19.

Figure 3:
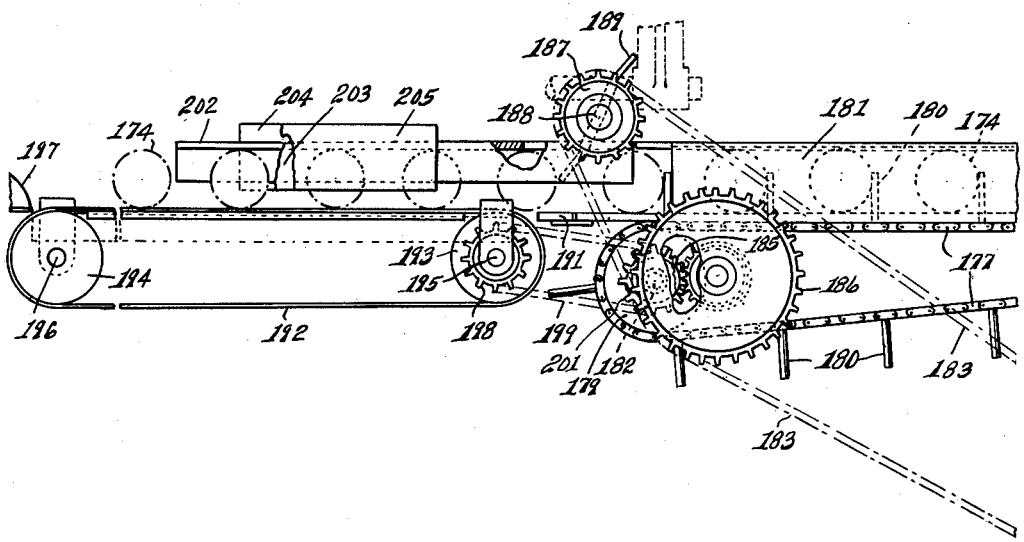
Figure 3 is a partial elevational view of the other end of the machine shown in Figure 1.

The folding way effects the folding operation as a result of moving the package with respect to the folding way, and such movement is accomplished by means of a package carrier conveyer including a conveyer chain 177, shown in Figure 2 and 3. The chain 177 traverses a drive sprocket 178 and an idler sprocket 179, as shown in Figure 3. The chain 177 has crossbars 180 to engage the packages 174, as shown in Figures 2 and 3. The crossbars 180 engage the packages as they are moved out of the folder head by the package pusher plate 172 and drag them under the heating plate 135, then through the space between the second end flap folder shoes 167, the third and fourth end flap 176, and finally between a pair of heating plates 181, best shown in Figure 15. These plates provide heating for the third and fourth end flaps of the package 174.

The drive sprocket 179 and conveyor chain 177 is secured to a shaft 182 and this shaft is driven by a chain drive 183 through gears 185 which are driven by sprocket 186. Chain 183 is driven by a sprocket secured to shaft 34.

The chain 183 also drives a sprocket 187 on a shaft 188. The shaft 188 carries two pairs of transfer fingers 189, adapted to engage the packages as they come from the conveyer chain 20 and moves them across a stationary plate 191 and on to a conveyer belt 192.

The conveyer belt 192 is trained around drums 193 and 194, mounted on shafts 195 and 196, respectively, and delivers completed packages to a take-away platform 197. The shaft 193 is driven by a sprocket 198 and a chain 199, the chain also extending around a sprocket 201, mounted on shaft 182 and driven therefrom, as shown in Figure 3.

A pair of angle-shaped corner folding and sealing members 202 and 203 are supported by any suitable means above the conveyer 192. The angles 202 and 203 are provided with heaters 204 and 205, respectively.

Operation

In the operation of my disclosed wrapping machine, when the machine is started the operator may stand beside the portion of the pocket conveyor 20, 25 shown in Figure 1 and place the proper number of sandwiches 26 in each pocket, or a suitable hopper may be provided with means to properly feed the sandwiches to the conveyer. The pocket conveyer 20, 25 advances intermittently, each advance being the distance from pocket to pocket. When a pocket is in position above the ram head 40, the pocket conveyer is stationary, whereupon the ram head raises for elevating the sandwiches out of the pocket 25 through an opening 206 in table 13 and against the wrapper 97, causing the wrapper to be bulged up at the center, as shown in Figure 5.

Further elevation of the ram head 40 results in the sandwiches 26 being elevated to the position shown in Figure 6, just after the plate 68 has been opened to the position shown in Figure 7, due to engagement of the stud 84 with the lateral end 61 of rod 60. This wraps the wrapper 97 a little over half way around the sandwiches and the closing of the arcuate plate 68 holds it in this partially wrapped condition.

Next, one of the bottom flaps of the package is folded as shown in Figure 9, this being accomplished by forward movement of the package engaging elements 128 during the first part of the forward movement of the slide bar 107. Thereafter, further forward movement of the slide bar causes the paper pusher plate 106 to continue its movement with the package engaging elements 128 held against the package, as shown in Figure 9. The plate 106 goes forward to a position adjacent the front paper engaging rod 98.

As the package moves up into the lowermost pocket of the folder head, it is compressed slightly endwise and a first fold made as illustrated, for example, in Figure 8, this fold being indicated at "1." The first end fold and the slight compression mentioned are effected by the compression plates 271 and 272 under the action of the springs 275.

The next step in the wrapping operation is to turn the folder head a quarter turn clockwise, about one-half of this movement being shown in Figure 10. Here, it will be noted that the second bottom flap fold has been accomplished, due to a wiping action of the package along the heating plate 129. At the same time, the heat from the plate seals the second bottom flap to the first one, so that the package is now sealed with the exception of its ends. The remainder of the quarter rotation of the folder head brings it to the position shown in Figure 11, where the bottom flaps are now in front and are being further heat-sealed by the heating plate 135.

The next step in the operation is to release the package from the folder head and this is accomplished as shown in Figure 12, by the forward motion of the ram 171 and plate 172. During the release of the package, the arcuate plate 68 is opened as it was when the folder head pocket was in its downward position, but this time opening action is accomplished by the stud 247 of cam arm 246 engaging extension 61 of rod 60.

As the pusher plate 172 releases the package from the holder head, it is picked up by the crossbars 180 of the chain 177 and carried under the heating plate 135 through the second end folder shoes 167, then through the folding way 176 for forming the third and fourth end folds and then through the heating plates 181 for heat sealing the ends of the package.

The flaps 1, 2, 3, and 4 have now been formed, but it will be noted that due to the round shape of the package the base corners or folds of the flaps result in substantially pointed projections of the wrapper indicated at 207 in Figure 18.

Aside from being unsightly, these projections occur at folded portions of the wrapper which may not be completely sealed up to this time. The machine does, however, completely seal the central portions of the flaps. In order to neatly fold down the projections 207 and insure complete sealing of the entire package and produce a package which is neat in appearance, the projections 207 are now folded down over the ends of the package and sealed. This is accomplished by transferring each package from the conveyer 20, 25 to the belt 192 by means of the transfer fingers 189. These fingers serve to force the packages into position between the angles 202 and 203.

The action that then takes place is a rolling action because the upper stretch of the conveyor belt 192 is travelling to the left as viewed in Figure 3, whereas the horizontal flanges of the angles 202 and 203 are stationary. The packages are accordingly being rolled under the angles at half the speed of the belt 192. The projections 207 on the package are, therefore, folded as shown in Figure 19 to provide flaps 5, 6, 7, and 8 and the electric heaters 204 and 205 definitely seal the flaps. The flap of the package, where it wraps around the cookies and terminates, is at the line 208 in Figures 18 and 19 and is further heat-sealed by the horizontal flanges of the angles 202 and 203. The angles thereby serve to iron out the wrinkles from the wrapper as well as seal it, and particularly at the projections 207, so that the resulting package is neat in appearance and is completely sealed.

From the foregoing, it will be apparent that I have provided an improved method of wrapping and sealing the packages, particularly packages which are cylindrical in shape.

Some changes may be made in the construction and arrangement of the parts of my method of wrapping articles without departing from the real spirit and purpose of my invention, and it is my intention to cover by my claim any modified forms of structure which may be reasonably included within their scope without sacrificing any of the advantages thereof.

I claim as my invention:

The method of wrapping a generally cylindrical article having flat end faces which comprises providing about said article a tubular wrapper of heat sealable sheet material having ends projecting beyond the flat article faces, folding the projecting wrapper ends inwardly against each of said article end faces to form flaps, sealing said flaps by application of heat, the resultant wrapping having projections at the base corners of said flaps and having wrinkles at the ends of the tubular wrapping portion, and while at both wrapping ends folding in and heat sealing each of said projections successively, also at the same time subjecting the ends of said tubular wrapping simultaneously to heat and to a generally tangentially directed compressive force, said subjection to heat and force being effected progressively around the peripheries of said tubular wrapping ends whereby said wrinkles are ironed out.

OSCAR SANDBERG.

REFERENCES CITED

The following references are of record in the file of this patent:

UNITED STATES PATENTS

| Number | Name | Date |
| --- | --- | --- |
| 1,337,693 | Dewey | Apr. 20, 1920 |
| 1,722,716 | Templin | July 30, 1929 |
| 1,740,582 | Farmer | Dec. 24, 1929 |
| 1,784,349 | Grover | Dec. 9, 1930 |
| 2,066,414 | Milmoe | Jan. 5, 1937 |
| 2,082,945 | Ferenci | June 8, 1937 |

FOREIGN PATENTS

| Number | Country | Date |
| --- | --- | --- |
| 171,276 | Great Britain | Nov. 17, 1921 |